United States Patent
Hu et al.

(10) Patent No.: US 8,046,439 B2
(45) Date of Patent: Oct. 25, 2011

(54) METHOD FOR INSTALLING EXT FILE SYSTEM

(75) Inventors: Yu Hu, Shenzhen (CN); Jian-Feng Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 265 days.

(21) Appl. No.: 12/548,101

(22) Filed: Aug. 26, 2009

(65) Prior Publication Data

US 2010/0318638 A1   Dec. 16, 2010

(30) Foreign Application Priority Data

Jun. 16, 2009   (CN) .......................... 2009 1 0303312

(51) Int. Cl.
*G06F 15/173*   (2006.01)

(52) U.S. Cl. ..................................................... 709/219

(58) Field of Classification Search .................. 709/219, 709/217
See application file for complete search history.

(56) References Cited

U.S. PATENT DOCUMENTS

| | | | |
|---|---|---|---|
| 6,754,696 B1 * | 6/2004 | Kamath et al. | 709/213 |
| 7,542,999 B2 * | 6/2009 | Kamath et al. | 707/201 |
| 7,921,217 B2 * | 4/2011 | Yan et al. | 709/229 |
| 7,979,886 B2 * | 7/2011 | Frojdh et al. | 725/135 |

\* cited by examiner

*Primary Examiner* — David Eng
(74) *Attorney, Agent, or Firm* — Altis Law Group, Inc.

(57) ABSTRACT

A method for installing EXT (extended) file system from a server to at least a client, the method includes the following steps. The super blocks of original files in a server are read to obtain subarea basic parameters of original files which are then packed into an image file. The reserved nodes and the first data pointing to the reserved nodes are analyzed in sequence. Whether the reserved nodes point to directory files is judged. A directory sequence is created according to the judge result. The nodes and the first data pointing to the nodes is reviewed. A client receives the image file and separates the subarea basic parameters of original files and data blocks from the image file, and calculates the basic data and data blocks for storing them in the client.

10 Claims, 4 Drawing Sheets

METHOD FOR INSTALLING EXT FILE SYSTEM

BACKGROUND

1. Technical Field

The present disclosure relates to a method for installing EXT (extended) file system, and particularly to a method for installing EXT file system from a server to clients.

2. Description of Related Art

Linux is a generic term referring to Unix-like computer operating systems based on the Linux kernel. Their development is one of the most prominent examples of free and open source software collaboration. Typically all the underlying source code can be used, freely modified, and redistributed by anyone under the terms of the GNU GPL and other free licenses. Linux is predominantly known for its use in servers, although it is installed on a wide variety of computer hardware, ranging from embedded devices and mobile phones to supercomputers. The EXT file system was invented in April 1992 and is the first file system created specifically for the Linux operating system. Typically, the EXT file system is installed to clients using an installation disc, which is inefficient and wastes much time and money.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
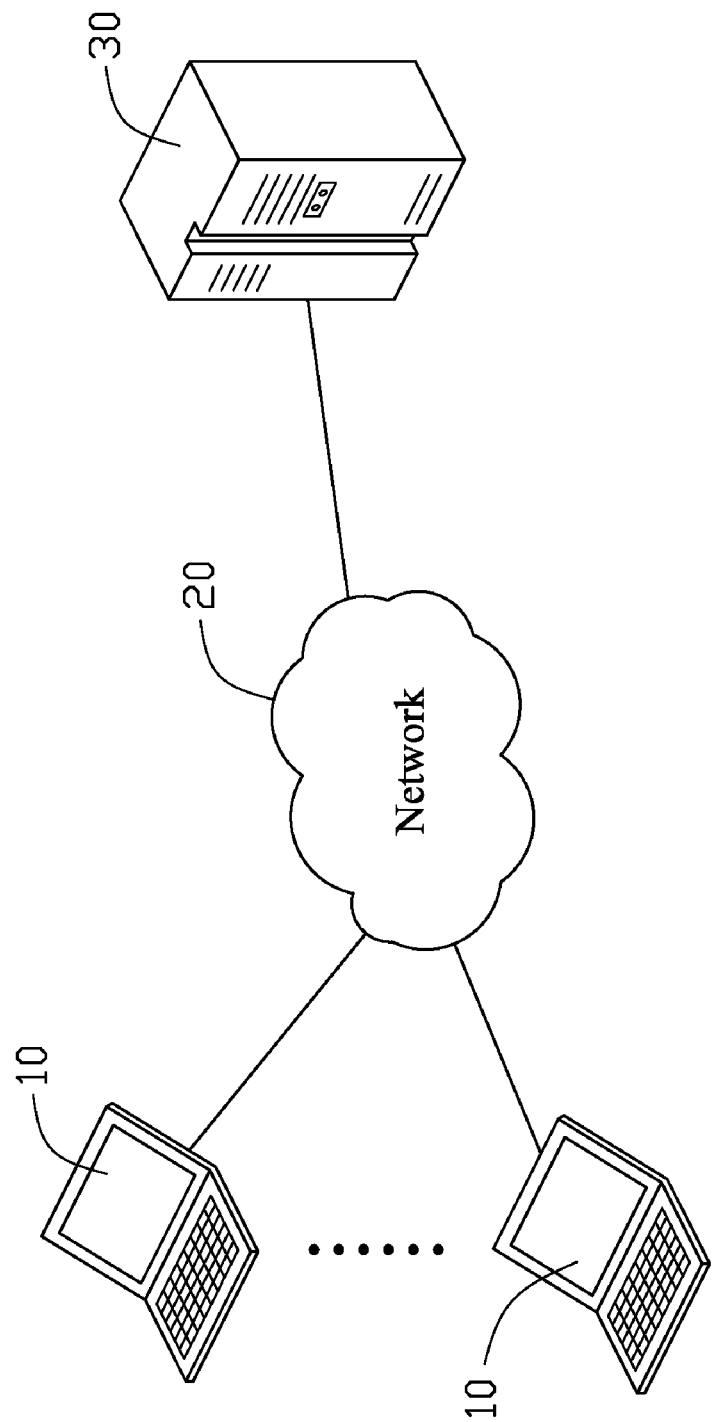
FIG. 1 is an isometric view of an embodiment of a system for installing EXT file system from a server to clients.
Figure 2:
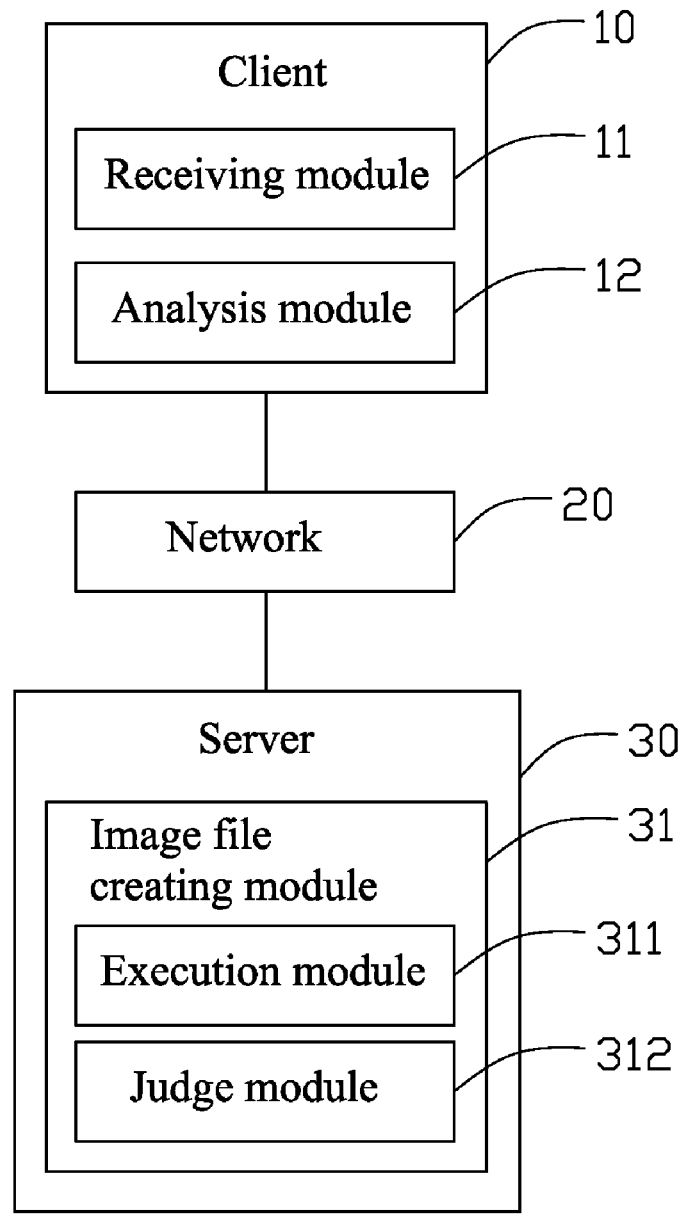
FIG. 2 is a block diagram of the system of FIG. 1.

Referring to FIGS. 1 and 2, a system for installing EXT file system from a server to clients includes at least a server 30, a network 20, and a plurality of clients 10. The plurality of clients 10 is coupled to the server via the network 20. In this embodiment, the network 20 can be an intranet, the Internet or other types of networks. The server 30 is installed using a Linux operation system.

The server 30 includes an image file creating system 31 for creating an image file of the EXT file system. The image file includes subarea basic parameters of original files and data blocks. The subarea basic parameters of original files includes size of the EXT file blocks, and number of reserved blocks and nodes. The data blocks include system data and file data. The image file creating system 31 includes an execution module 311, and a judge module 312. The execution module 311 reads data and path of the data from the server 30, and packs the data and path to create an image file. The server 30 transmits the image file to the clients 10 via the network 20.

Each client 10 includes a receiving module 11, and an analysis module 12. The receiving module 11 receives the image file of EXT file system from the server 30. The analysis module 12 analyzes data and path of the data from the image file received by the receiving module 11, and stores data and path of the data in hard disc of the client 10.

Figure 3A:
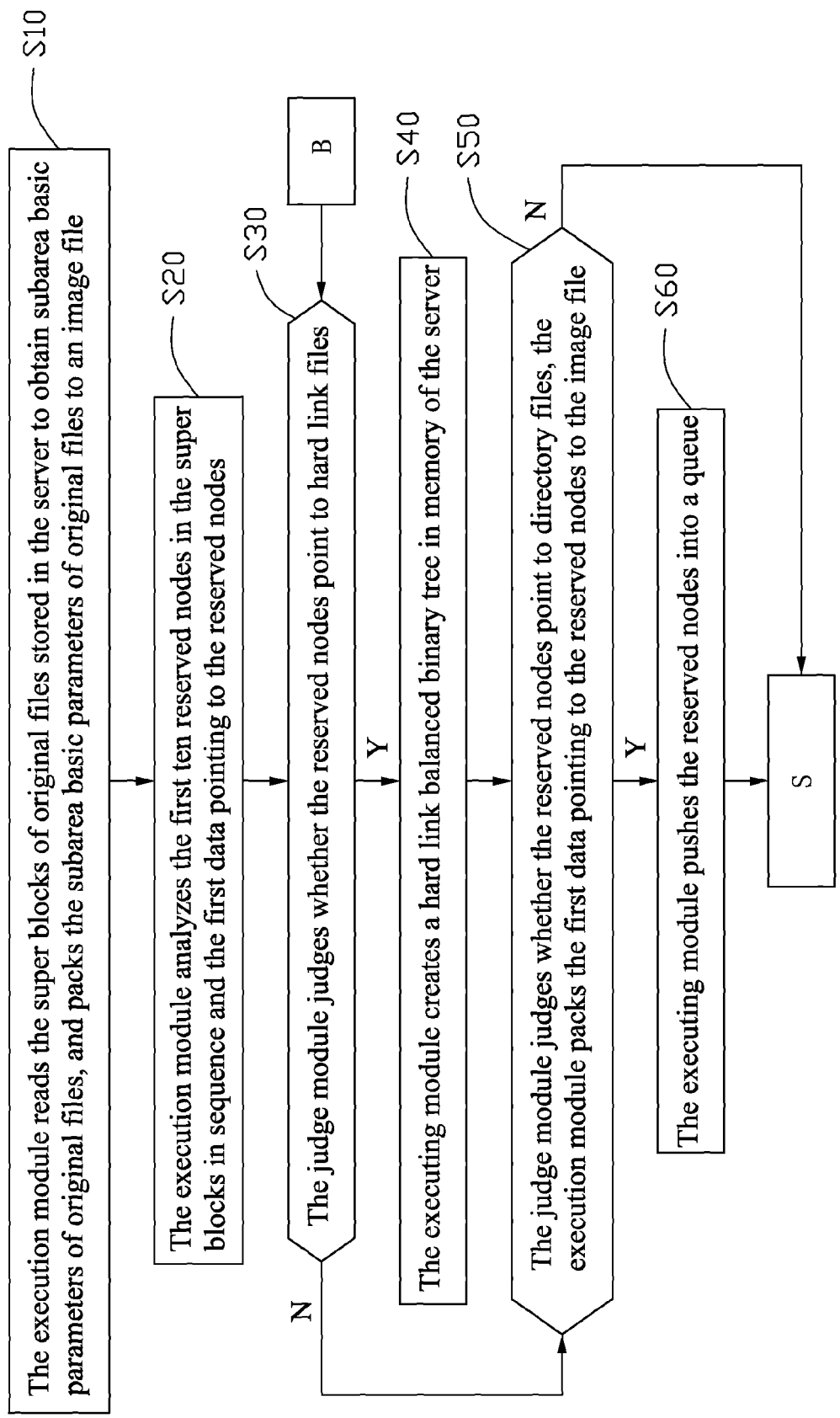
FIG. 3 is a flow chart illustrating a method for installing EXT file system from a server to clients.
Figure 3B:
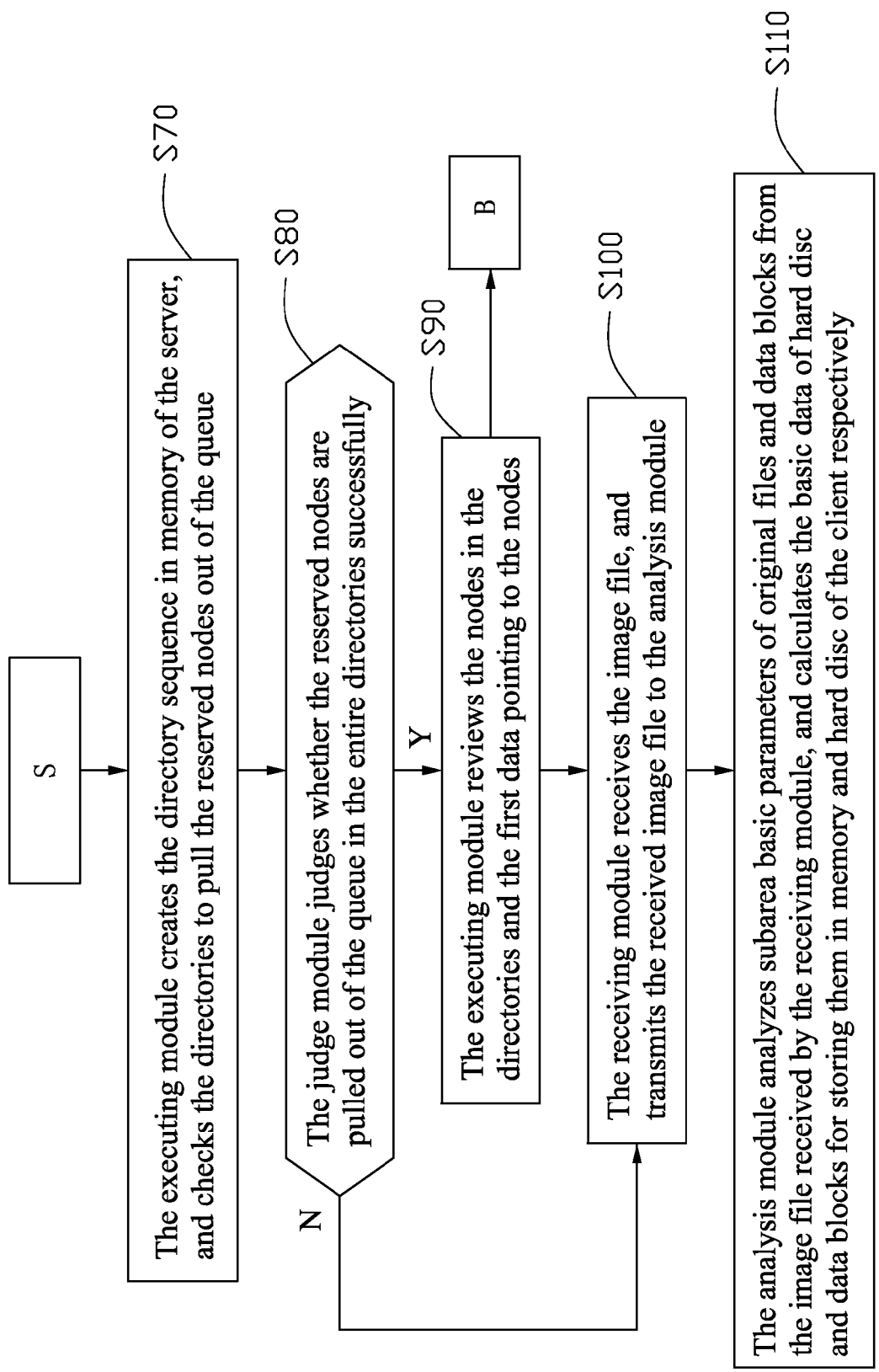

FIG. 3 is a flow chart illustrating a method for installing EXT file system from a server to clients. Depending on the embodiment, certain steps described below may be removed, while others may be added, and the sequence of the steps may be altered. In one embodiment, the method for installing the EXT file system from a server to clients utilizing the above-described system includes the following steps:

S10: the execution module 311 reads the super blocks of original files stored in the server 30 to obtain subarea basic parameters of original files and packs the subarea basic parameters of original files into an image file;

S20: the execution module 311 analyzes the first ten reserved nodes in the super blocks in sequence and the first data pointing to the reserved nodes;

S30: the judge module 312 judges whether the reserved nodes point to hard link files, if the reserved nodes point to hard link files, proceed to step S40; if not then step S50 is next;

S40: the executing module 311 creates a hard link balanced binary tree in the memory of the server 30;

S50: the judge module 312 judges whether the reserved nodes point to directory files, the execution module 311 packs the first data pointing to the reserved nodes to the image file, if the reserved nodes point to directory files, proceed to S60; if not then step S70;

S60: the executing module 311 pushes the reserved nodes into a queue;

S70: the executing module 311 creates the directory sequence in memory of the server 30, and checks the directories to pull the reserved nodes out of the queue;

S80: the judge module 312 judges whether the reserved nodes are pulled out of the queue in the entire directories successfully, if the reserved nodes are pulled out of the queue successfully, proceed to step S90; if not, then to step S100;

S90: the executing module 311 reviews the nodes in the directories and the first data pointing to the nodes, and if the entire directories are not searched, return to step S30;

S100: the receiving module 11 receives the image file and transmits the received image file to the analysis module 12;

S110: the analysis module 12 analyzes subarea basic parameters of original files and data blocks from the image file received by the receiving module 11, and calculates the basic data of hard disc and data blocks for storing them in memory and hard disc of the client 10 respectively.

The basic data of hard disc includes super blocks, node blocks, and file blocks. If the super blocks from the data blocks are analyzed, the client 10 adjusts parameters of super blocks in its memory;

if the node blocks from the data blocks are analyzed, the analysis module 12 calculates addresses of the nodes and files pointed to by the nodes on hard disc of the client 10, the client 10 stores the nodes and files in its hard disc;

if the file blocks from the data blocks are analyzed, the analysis module 12 calculates addresses of the files on hard disc of the client 10, the client 10 stores the files in its hard disc.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed. It is also to be understood that the above description and the claims drawn to a method may include some indication in reference to certain steps. However, the indication used is only to be viewed for identification purposes and not as a suggestion as to an order for the steps.

What is claimed is:

1. A method for installing extended (EXT) file system from a server to at least a client, the method comprises the following steps:

reading the super blocks of original files stored in a server to obtain subarea basic parameters of the original files and packing the subarea basic parameters of the original files into an image file;

analyzing the reserved nodes in the super blocks in sequence and the first data pointing to the reserved nodes;

judging whether the reserved nodes point to directory files;

packing the first data pointing to the reserved nodes to the image file;

creating a directory sequence according to the judge result;

reviewing the nodes in the directories and the first data pointing to the nodes until the entire directories are searched.

2. The method of claim 1, further comprising, after reviewing the nodes and the first data pointing to the nodes, a client receives the image file and separates the subarea basic parameters of the original files and the data blocks from the image file, and calculates the basic data and data blocks for storing them in memory and hard disc of the client respectively.

3. The method of claim 1, wherein if the reserved nodes point to directory files, the reserved nodes are pushed into a queue, then creates the directory sequence in a memory of the server.

4. The method of claim 3, wherein if the reserved nodes do not point to directory files, the executing module creates the directory sequence directly in the memory of the server.

5. The method of claim 1, further comprising, after analyzing the reserved nodes and the first data pointing to the reserved nodes, judging whether the reserved nodes point to hard link files.

6. The method of claim 5, wherein if the reserved nodes point to hard link files, creating a hard link balanced binary tree in memory of the server and judging whether the reserved nodes point to directory files.

7. The method of claim 6, wherein if the reserved nodes do not point to hard link files, determining whether the reserved nodes point to directory files directly.

8. The method of claim 1, wherein if the super blocks from the data blocks are analyzed, the client adjusts parameters of super blocks in its memory.

9. The method of claim 1, wherein if the node blocks from the data blocks are analyzed, the analysis module calculates addresses of the nodes and files pointed by the nodes on hard disc of the client, the client stores the nodes and files in its hard disc.

10. The method of claim 1, wherein if the file blocks from the data blocks are analyzed, the analysis module calculates addresses of the files on hard disc of the client, the client stores the files in its hard disc.

* * * * *